US012746955B2

(12) United States Patent
Yu et al.

(10) Patent No.: US 12,746,955 B2
(45) Date of Patent: Sep. 29, 2026

(54) TRAVELING RAIL DETECTION SYSTEM WITH A MULTI-AXIS ADJUSTMENT OF DETECTION DEVICE

(71) Applicant: Shanghai Oriental Machine Vision & Inspection Technology Co., Ltd, Shanghai (CN)

(72) Inventors: Tianle Yu, Shanghai (CN); Jian Wan, Shanghai (CN); Jianjun Wang, Shanghai (CN); Yongjun Li, Shanghai (CN); Yanhua Wu, Shanghai (CN); Jun Kuang, Shanghai (CN); Jidong Yao, Shanghai (CN)

(73) Assignee: Shanghai Oriental Machine Vision & Inspection Technology Co., Ltd, Shanghai (CN)

( * ) Notice: Subject to any disclaimer, the term of this patent is extended or adjusted under 35 U.S.C. 154(b) by 347 days.

(21) Appl. No.: 18/260,154

(22) PCT Filed: Dec. 31, 2020

(86) PCT No.: PCT/CN2020/142032

§ 371 (c)(1),
(2) Date: Jun. 30, 2023

(87) PCT Pub. No.: WO2022/141370

PCT Pub. Date: Jul. 7, 2022

(65) Prior Publication Data

US 2024/0059330 A1 Feb. 22, 2024

(51) Int. Cl.
*B61K 9/08* (2006.01)
*B61K 9/10* (2006.01)
(Continued)

(52) U.S. Cl.
CPC .................. *B61K 9/08* (2013.01); *B61K 9/10* (2013.01); *G01N 29/04* (2013.01); *G01N 29/265* (2013.01)

(58) Field of Classification Search
CPC . B61K 9/08; B61K 9/10; G01N 29/04; G01N 29/265
(Continued)

(56) References Cited

U.S. PATENT DOCUMENTS 5,349,861 A * 9/1994 Catot .................. G01N 29/223 73/598
2012/0218868 A1* 8/2012 Kahn .................. G01N 29/265 367/99

FOREIGN PATENT DOCUMENTS

CN 102445495 A * 5/2012
CN 204265257 U 4/2015
(Continued)

OTHER PUBLICATIONS

Translation CN-102445495 (Year: 2012).*
Translation_CN107505397 (Year: 2017).*

*Primary Examiner* — Peter J Macchiarolo
*Assistant Examiner* — Monica S Young
(74) *Attorney, Agent, or Firm* — MUNCY, GEISSLER, OLDS & LOWE, P.C.

(57) ABSTRACT

In a rail detection system, a traveling mechanism and a horizontal moving mechanism move a detection device accurately to a position directly above a position to be detected by moving parallel to an extension direction of the rail. A vertical lifting mechanism is provided with the detection device, and can drive the detection device to lift up and down. A aligning mechanism is connected with the detection device, and includes a force-bearing mechanism and a follow-up mechanism. The force-bearing mechanism is configured to generate a force along a direction perpen-
(Continued)

dicular to the extension direction of the rail when being in a non-aligned position. Under the condition of being forced, the follow-up mechanism makes an adaptive adjustment movement along the direction perpendicular to the extension direction of the rail so that the detection device is aligned with a center of the rail.

14 Claims, 11 Drawing Sheets

(51) Int. Cl.
*G01N 29/04* (2006.01)
*G01N 29/265* (2006.01)

(58) Field of Classification Search
USPC .......................................................... 73/865.8
See application file for complete search history.

(56) References Cited

FOREIGN PATENT DOCUMENTS

| | | | | | |
|---|---|---|---|---|---|
| CN | 204388805 | U | * | 6/2015 | |
| CN | 204415430 | U | | 6/2015 | |
| CN | 205524254 | U | | 8/2016 | |
| CN | 105946878 | A | | 9/2016 | |
| CN | 106370113 | A | * | 2/2017 | ............... B61K 9/08 |
| CN | 107505397 | A | * | 12/2017 | ........... G01N 29/265 |
| CN | 105445379 | B | * | 6/2018 | ........... G01N 29/225 |
| CN | 109373959 | A | | 2/2019 | |
| CN | 109521097 | A | | 3/2019 | |
| CN | 110006999 | A | | 7/2019 | |
| CN | 110686964 | A | | 1/2020 | |
| CN | 210852471 | U | * | 6/2020 | |
| CN | 111595940 | A | * | 8/2020 | ............. G01N 29/04 |
| CN | 119611441 | A | * | 3/2025 | ............... E01H 8/10 |

* cited by examiner

TRAVELING RAIL DETECTION SYSTEM WITH A MULTI-AXIS ADJUSTMENT OF DETECTION DEVICE

BACKGROUND OF THE INVENTION

Field of the Invention

The invention relates to railcar and rail detection technology, in particular, to a railcar-mounted rail detection device.

Description of the Prior Art

With the construction and operation of a large number of high-speed railways in our country, the total mileage of railways in our country has exceeded 130000 kilometers, and railway transportation and production have put forward new requirements for maintenance operations on railway lines. The original operation method of checking the line according to the running time standard of a train between two adjacent stations or lines has been replaced by the existing skylight operation method. The hand-push flaw detector with an operating speed of only 2 km/h has low detection efficiency in the 3-4 h skylight time, and requires a lot of manpower to carry out segmented and simultaneous detection. Railway transportation is the main artery of transportation logistics and national economy. Rail is the basic component of the railway system and plays a role in supporting the train. In order to ensure safe operation, strict requirements for quality inspection are put forward for the rail.

The existing hand-push or hand-held rail detection equipment has at least the following disadvantages:

1. The length of the rail is long, and it is very laborious for inspectors to hold the device or push the trolley for a long time for a long distance, and the manual movement speed is relatively slow, so that the detection efficiency is relatively low.

2. The working place of the existing rail detection device is on the rail; generally, the area where the rail is laid is relatively remote, and there is no convenient place for charging; therefore, the detection time and detection length of the existing detection device are limited by the storage capacity of the storage battery, which is inconvenient to use.

The existing rail detection equipment, i.e., the double-track flaw detection vehicle, has at least the following disadvantages:

In the process of aligning the positions of the rail, the existing rail detection equipment lacks the function of aligning with the center of the rail to be detected, which is prone to position deviation. During the actual use of the device, the operator needs to manually adjust the position according to visual inspection, which affects work efficiency, e.g., manually controlling the electric push rod to make the detection wheels move along the sliding guiding rail to ensure that the detection wheels are vertically aligned with the center of the rail.

SUMMARY OF THE INVENTION

In order to solve the above problems, the invention provides a rail detection system so as to improve the problems of low automation, time-consuming and labor-intensive operation, and low detection efficiency of existing rail detection devices, and can change the situation that the detection equipment needs to be adjusted manually in the past, thereby realizing the effect of automatically and quickly aligning the detection device to the center of the rail.

The technical solution of the invention is as follows:

A rail detection system includes:

a traveling mechanism, traveling along the rail to transport a detection device to a vicinity of a preliminary-positioned position to be detected for preparing detection operations;

a horizontal moving mechanism, connected with the traveling mechanism, wherein the traveling mechanism drives the horizontal moving mechanism to travel, and after the traveling mechanism stops at the vicinity of the position to be detected, the horizontal moving mechanism moves parallel to the extension direction of the rail to accurately move the detection device to a position directly above a precisely-positioned position to be detected;

a vertical lifting mechanism, connected with the horizontal moving mechanism, wherein the vertical lifting mechanism is provided with the detection device, and the vertical lifting mechanism lifts vertically to drive the detection device to lift up and down;

an aligning mechanism, connected with the detection device and comprising a force-bearing mechanism and a follow-up mechanism, wherein the force-bearing mechanism is configured to generate a force along a direction perpendicular to the extension direction of the rail when being in a non-aligned position, and under the condition of being forced, the follow-up mechanism disposed between the vertical lifting mechanism and the horizontal moving mechanism makes an adaptive adjustment movement along the direction perpendicular to the extension direction of the rail so that the detection device is aligned with a center of the rail.

During the alignment, when the vertical lifting mechanism drives the detection device to move down, the force-bearing mechanism contacts the rail head to generate a vertical force, and the position deviation between the force-bearing mechanism and the rail head generates a force along the direction perpendicular to the extension direction of the rail, and the follow-up mechanism between the vertical lifting mechanism and the horizontal moving mechanism is driven by the reaction force perpendicular to the force on the extension direction of the rail so that the vertical lifting mechanism makes an adaptive adjustment movement along the direction perpendicular to the extension direction of the rail and finally the vertical lifting mechanism and the detection device are aligned with the center of the rail, wherein a vertical downward force provided by the vertical lifting mechanism is perpendicular to the rail surface, and the detection device may be pressed tightly on the rail surface.

Preferably, the force-bearing mechanism is a guiding wheel, the guiding wheel is disposed at a lower end of the vertical lifting mechanism, and the guiding wheel is connected with the detection device and comprises two side guiding wheels elastically connected with each other; an inner surface of the side guiding wheel is used to fit inner and outer surfaces of a rail head so that the aligning mechanism may achieve alignment; when the vertical lifting mechanism drives the aligning mechanism to move down, two inner surfaces of the guiding wheel are adjusted movably by an elastic force to fit a tread surface of the rail head and surfaces of the inner and outer sides of the rail head so that the detection device is aligned with the position to be detected.

Preferably, the force-bearing mechanism includes two symmetrical side guiding wheels, a connecting shaft and an elastic member; the two side guiding wheels are sleeved on the connecting shaft to form the guiding wheel, and the outer surfaces or the inner surfaces of two side guiding wheels are provided with the elastic member so that the guiding wheel is used for movable configuration of the two inner surfaces that fit the inner and outer surfaces of the rail head.

Preferably, the force-bearing mechanism includes a vertical plate; the vertical plate is disposed at the lower end of the vertical lifting mechanism, the guiding wheel is connected with the vertical plate, and the detection device is connected with the vertical plate so that the guiding wheel is connected with the detection device.

Preferably, the follow-up mechanism is disposed at a joint between the vertical lifting mechanism and the traveling mechanism, and the follow-up mechanism and the traveling mechanism adopt a structure of shafts and bearings that are movably fitted along a long waist holes provided along the direction perpendicular to the extension direction of the rail or the follow-up mechanism adopts a structure of a freely-movable guiding rail connection provided along the direction perpendicular to the extension direction of the rail.

Preferably, the aligning mechanism includes a proximity switch, and the proximity switch is disposed at the lower end of the vertical lifting mechanism and located at the inner or outer surface of the rail head; the proximity switch senses a distance between the proximity and the inner or outer surface of the rail head at a certain distance below the tread surface of the rail head within a sensing range, and adjusts the horizontal moving mechanism to move according to a preset distance to drive the detection device below the horizontal moving mechanism to move to the position to be detected for aligning directly above the center of the rail; the vertical lifting mechanism drives the detection device to move down to the position to be detected.

Preferably, the force-bearing mechanism includes the guiding wheel and a guiding plow, the guiding wheel fits the tread surface of the rail head and the inner surface of the rail head, and the guiding plow fits close to the inner surface of the rail head.

Preferably, the follow-up mechanism includes an elastic tension device, and the detection device is connected with the traveling mechanism by a bracket; the bracket is connected with the horizontal moving mechanism by the elastic tension device, and the elastic tension device provides an elastic force along the direction perpendicular to the extension direction of the rail to adjust a relative position between the detection device and the rail.

Preferably, the horizontal moving mechanism further moves along the direction perpendicular to the extension direction of the rail.

Preferably, the horizontal moving mechanism moves along a direction parallel to the extension direction of the rail or moves along the direction perpendicular to the extension direction of the rail by way of being driven by an air cylinder, a hydraulic cylinder, a screw, a synchronous belt or a push rod; the vertical lifting mechanism is lifted by way of being driven by the air cylinder, the hydraulic cylinder, the screw, the synchronous belt or the push rod.

Preferably, the horizontal moving mechanism is mounted and fixed on the traveling mechanism, or the horizontal moving mechanism is connected with the traveling mechanism by a drag connecting mechanism.

Preferably, the horizontal moving mechanism is fixedly or hingedly connected with the vertical lifting mechanism.

Preferably, the detection device is fixedly or hingedly connected with the vertical lifting mechanism.

Preferably, the traveling mechanism realizes traveling by providing a drive device internally or connecting the drive device externally.

Compared with the prior art, the invention has the following beneficial effects:

First. In the invention, the traveling mechanism moves along the rail to transport the detection device to the position to be detected preliminarily as a whole, the movement and positioning are performed by the horizontal moving mechanism, and the force along the direction perpendicular to the extension direction of the rail is generated by the force-bearing mechanism of the aligning mechanism when in a non-aligned position; the reaction force of the force acts on the follow-up mechanism to further drive the detection device to make the adaptive adjustment movement along the direction perpendicular to the extension direction of the rail for realizing alignment, and the vertical downward force provided by the vertical lifting mechanism is perpendicular to the rail surface, and the detection device may be positively pressed and tightly attached to the rail surface. The aligning device has a simple and reliable structure, may realize real-time automatic and precise alignment, and provides the possibility for automatic detection.

Second. The horizontal moving mechanism realizes the movement of the detection device along the direction perpendicular to the extension direction of the rail on a horizontal plane or along the direction parallel to the extension direction of the rail, and the detection device may be accurately moved to the position to be detected or moved to a certain position for re-inspection through the horizontal moving mechanism.

Third. In the invention, through the provisions of the proximity switch or the guiding wheels, in the process of aligning the detection device to the position to be detected, the aligning mechanism may prevent the position of the detection device from deviating, and further align to ensure that the detection device may be aligned to the position to be detected.

Fourth. In the invention, another structure adjusts the relative position between the horizontal moving mechanism and the rail through the elastic tension device, which may prevent the position of the detection device from deviating, and further align to ensure that the detection device may be aligned with the center of the rail at the position to be detected.

Certainly, any one product for implementing the present invention is unnecessary to achieve all the above advantages at the same time.

DESCRIPTION OF THE PREFERRED EMBODIMENTS

The following further describes the present invention in combination with specific embodiments and drawings. It should be understood that these embodiments are only used for illustrating the present invention, but not for the limitation of the scope of the present invention. Improvements and adjustments made by those skilled in the art according to the invention in practical applications still belong to the protection scope of the invention.

For a clearer description of the direction of the embodiment, taking the rail as the reference, the plane where the two rails are located is the horizontal plane; in the horizontal plane, the extending direction of the rail is the longitudinal direction, and the direction perpendicular to the rail is the transverse direction.

Figure 1:
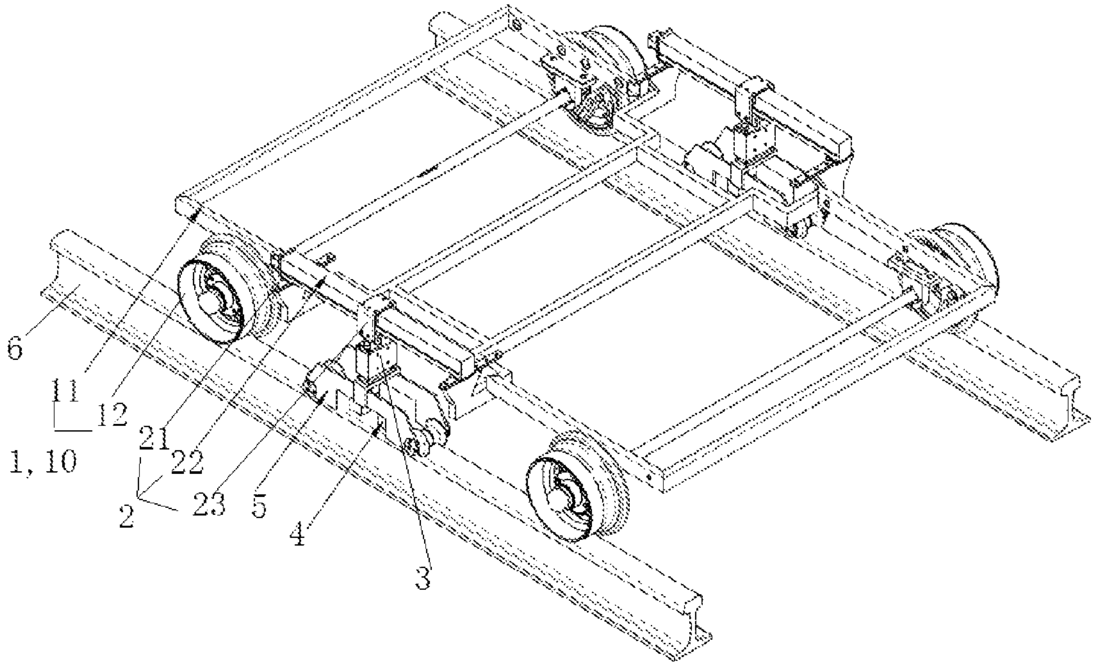
FIG. 1 is a structural diagram of a rail detection system according to the invention.
Figure 11:
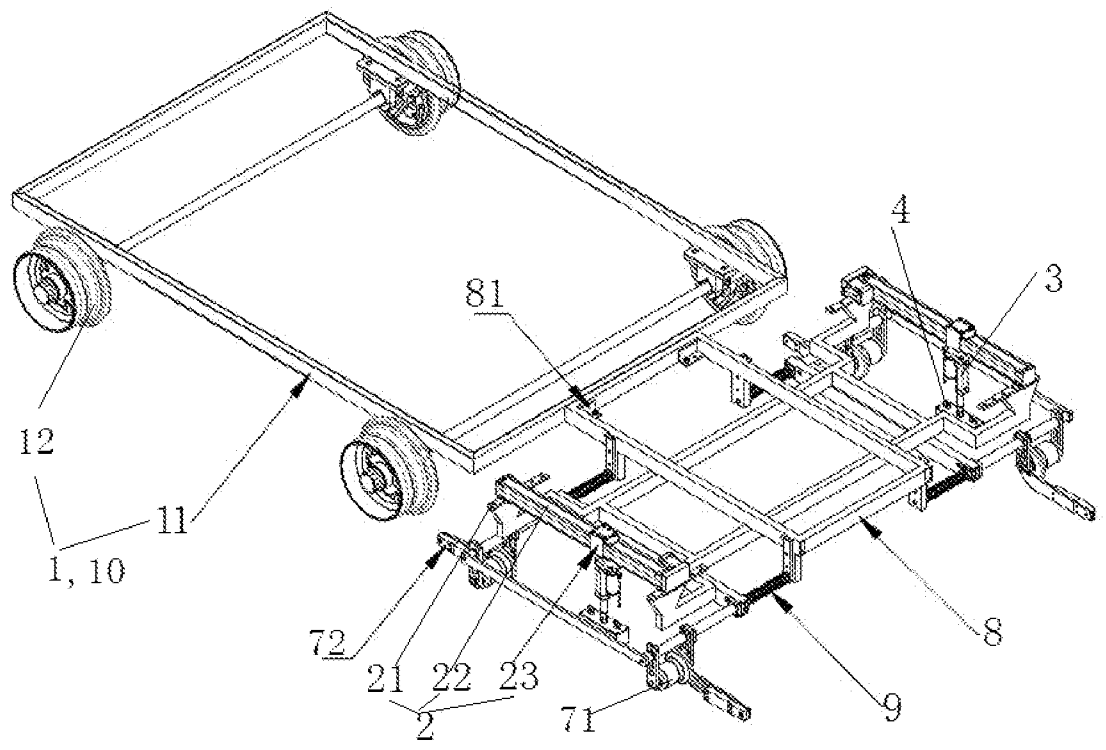
FIG. 11 is a structural diagram of another rail detection system according to the invention.

A rail detection system, as shown in FIGS. 1 and 11, includes:

- a traveling mechanism 1, wherein the traveling mechanism 1 travels along the rail to transport a detection device 4 to a vicinity of a preliminary-positioned position to be detected for preparing detection operations;
- a horizontal moving mechanism 2, wherein the horizontal moving mechanism 2 is connected with the traveling mechanism 1, and wherein the traveling mechanism 1 drives the horizontal moving mechanism 2 to travel, and after the traveling mechanism stops at the vicinity of the position to be detected, the horizontal moving mechanism 2 moves parallel to the extension direction of the rail to accurately move the detection device to a position directly above a precisely-positioned position to be detected;
- a vertical lifting mechanism 3, wherein the vertical lifting mechanism 3 is connected with the horizontal moving mechanism 2, and wherein the horizontal moving mechanism 2 moves along the direction parallel to the extension direction of the rail and/or along the direction perpendicular to the extension direction of the rail; the vertical lifting mechanism 3 is provided with the detection device 4, and the vertical lifting mechanism 3 vertically lifts and drives the detection device 4 to descend to land on the rail 6 to be detected; the multi-dimensional movement of the detection device is realized through the horizontal moving mechanism 2 and vertical lifting mechanism 3 mentioned above;
- an aligning mechanism, wherein the aligning mechanism is connected with the detection device 4 and includes a force-bearing mechanism 5, 7 and a follow-up mechanism, wherein the force-bearing mechanism 5, 7 is configured to generate a force along a direction perpendicular to the extension direction of the rail when being in a non-aligned position; when the vertical lifting mechanism 3 drives the detection device 4 to move down, the force-bearing mechanism 5, 7 contacts the rail head to generate a vertical force, and the position deviation between the force-bearing mechanism 5, 7 and the rail head generates a force along the direction perpendicular to the extension direction of the rail, and the follow-up mechanism on the vertical lifting mechanism 3 is driven by the reaction force perpendicular to the force on the extension direction of the rail so that the vertical lifting mechanism 3 makes an adaptive adjustment movement along the direction perpendicular to the extension direction of the rail and finally the vertical lifting mechanism and the detection device are aligned with the center of the rail, wherein a vertical downward force provided by the vertical lifting mechanism is perpendicular to the rail surface, and the detection device may be pressed tightly on the rail surface.

The force-bearing mechanism 5 may be a guiding wheel. The guiding wheel includes two side guiding wheels elastically connected with each other, and an inner surface of the side guiding wheel is used to contact and fit an inner surface of the rail head for realizing alignment.

The aligning mechanism adjusts the position of the detection device, so that the detection device is aligned with the center of the rail, and the detection device starts detection operations;

- after the detection operations are completed for one position to be detected, the vertical lifting mechanism and the horizontal moving mechanism return to their original positions in turn, the detection device is restored to the original state as a whole, and then the traveling mechanism or the horizontal moving mechanism continues to the next position to be detected for detection;
- or during the traveling process of the traveling mechanism, the horizontal moving mechanism, the vertical lifting mechanism, and the aligning mechanism are kept in an operating state, so that the detection device may continuously detect the rail.

Certainly, the horizontal moving mechanism may also be omitted as required, and the similar horizontal movement parallel to the extension direction of the rail performed by the horizontal moving mechanism may also be realized by the traveling mechanism. The vertical lifting mechanism 3 is connected with the traveling mechanism through suitable connecting parts. Then, the aligning mechanism adjusts the position of the detection device, which may be directly performed on the detection device, or indirectly performed on the detection device through the horizontal moving mechanism or a vertical lifting mechanism, so that the detection device is aligned with the center of the rail, wherein being aligned with the center of the rail is referred to as being aligned with the position to be detected or as alignment.

The sequence of occurrence of the movements of the aligning mechanism during alignment, of the horizontal moving mechanism, and the vertical lifting mechanism may be designed according to the specific structure or needs, or even multiple movements may be performed at the same time. The sequence of movements in the following specific embodiments is not limited to the following embodiments unless otherwise specified.

In the following embodiments, the provision of the horizontal moving mechanism 2 is taken as an example for illustration.

As shown in FIG. 1, the vertical lifting mechanism 3 is provided with the detection device 4 and the aligning mechanism 5, and the vertical lifting mechanism 3 lifts vertically to drive the detection device 4 and the aligning mechanism 5 to lift up and down;

the detection device 4 is connected with the aligning mechanism 5, and when the vertical lifting mechanism 3 drives the detection device 4 to descend, the aligning mechanism 5 adjusts the relative position between the aligning mechanism 5 itself and the rail 6 so that the position of the detection device 4 is adjusted and the detection device 4 is aligned with the position to be detected on the rail.

With reference to FIG. 1, the transverse movement/longitudinal movement of the detection device 4 on the horizontal plane is realized by the horizontal moving mechanism 2, and the vertical lifting mechanism 3 lifts the detection device up and down and is fixed in the position by connecting the detection device 4 with the aligning mechanism 5; the aligning mechanism 5 adjusts the relative position between the aligning mechanism itself and the rail so that the position of the detection device 4 is adjusted and the detection device 4 is aligned with the position to be detected on the rail.

Figure 10:
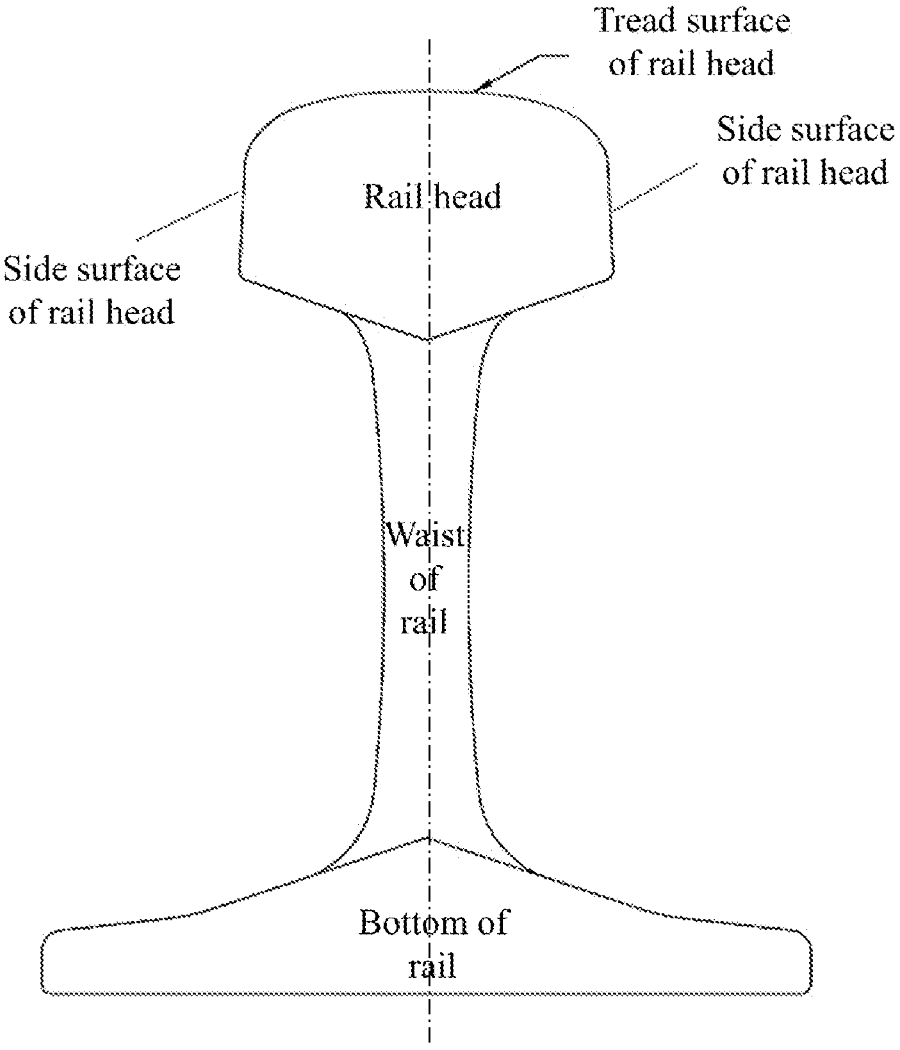
FIG. 10 is a simplified cross-sectional diagram of the rail.

The detection device 4 is aligned with the position to be detected on the rail, which generally means that the detection device 4 is aligned with the center of the rail at the position to be detected. Specifically, with reference to FIG. 10, the rail head, the tread surface of the rail head, and the side surface of the rail head (also called inner and outer side surfaces of the rail head, including the inner surface of the rail head and the outer surface of the rail head) are shown. Due to the symmetrical structure of the rail, the center of the rail is located on the centerline that vertically bisects the rail. The centerline is shown as the break point line in FIG. 10. The center of the detection device is located on the centerline of the rail, which may be considered that the detection device 4 is aligned with the position to be detected.

The traveling mechanism 1 may adopt the mechanism that can travel on the rail in the prior art. As shown in FIG. 1, the traveling mechanism is a trolley 10, including a frame 11 and traveling wheels 12; the front and rear ends of the frame 11 are provided with the traveling wheels 12, the traveling wheels 12 are the supporting rolling wheels of the trolley 10 on the rail 3, and play the role of supporting and guiding when the trolley 10 travels on the rail 3. Further, the traveling mechanism realizes traveling by providing a drive device internally or connecting the drive device externally. The implementation form of the drive device may be electric, hand-push, etc., which is not limited here.

As shown in FIG. 1, the horizontal moving mechanism 2 is disposed on the traveling mechanism 1 to be connected with the traveling mechanism 1, wherein the connection method is not limited here. In an embodiment, when the traveling mechanism is the trolley 10, the horizontal moving mechanism 2 is disposed on the frame 11 to be connected with the frame 11, and in order to correspond to the left and right rails, the horizontal moving mechanism 2 is symmetrically disposed between the front and rear traveling wheels on both sides of the detection trolley 10.

Figure 4:
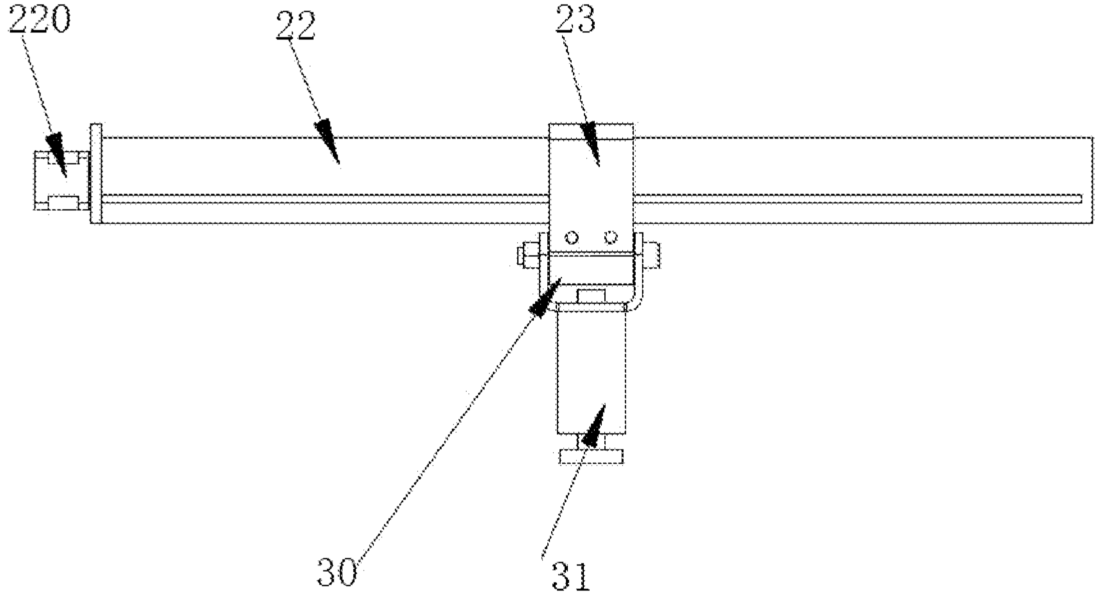
FIG. 4 is a side diagram of FIG. 3.
Figure 14:
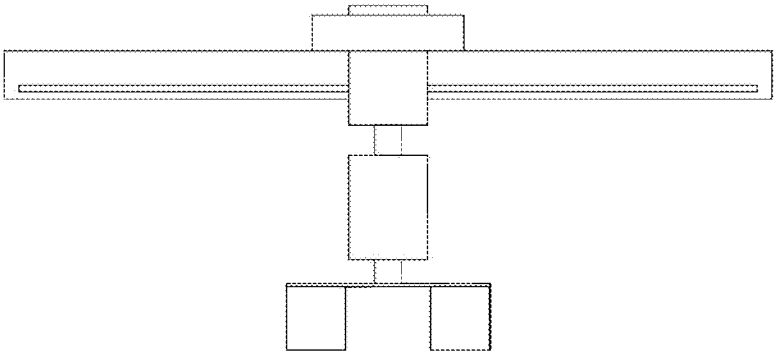
FIG. 14 is a diagram of driving the vertical lifting mechanism by a sliding block rail.
Figure 15:
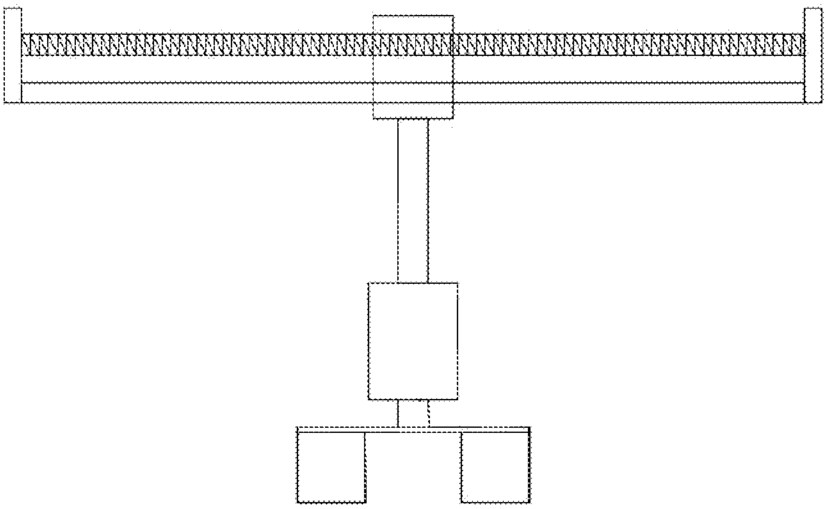
FIG. 15 is a diagram of driving the vertical lifting mechanism by a screw.
Figure 16:
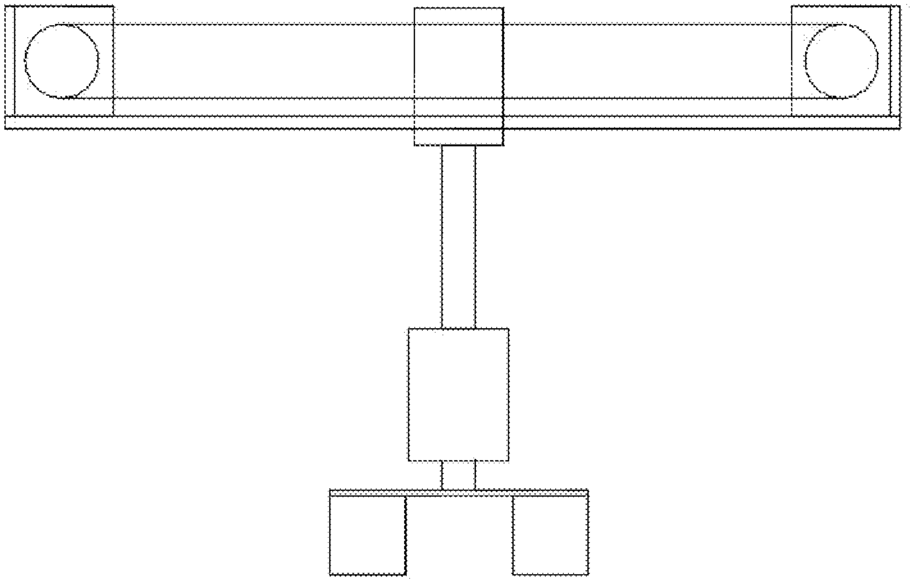
FIG. 16 is a diagram of driving the vertical lifting mechanism by a synchronous belt.
Figure 17:
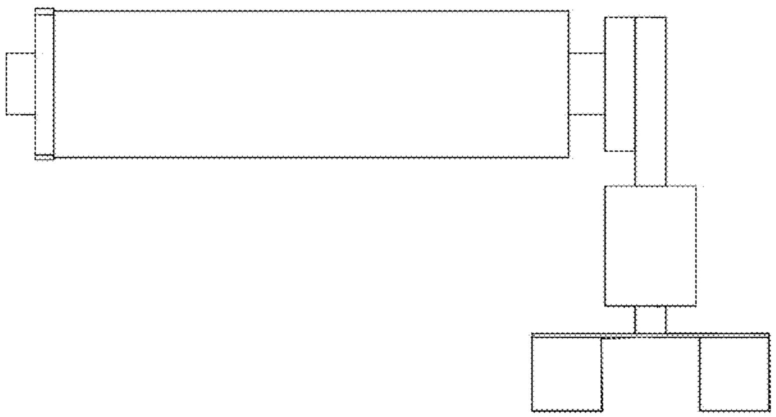
FIG. 17 is a diagram of driving the vertical lifting mechanism by an air cylinder.
Figure 18:
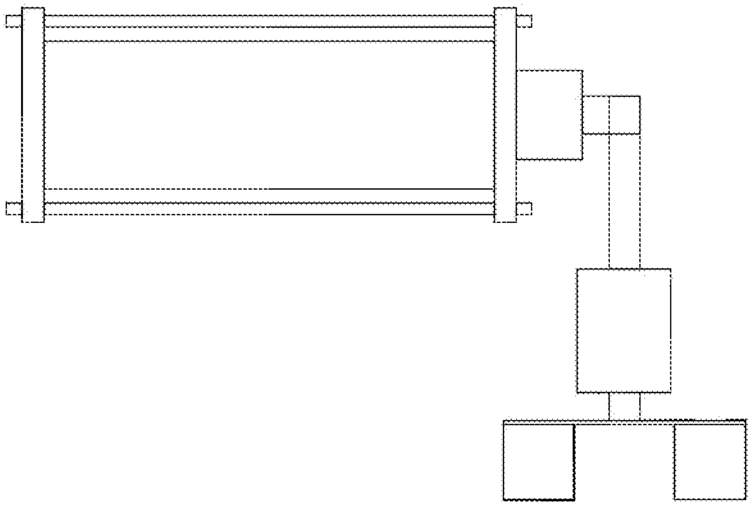
FIG. 18 is a diagram of driving the vertical lifting mechanism by a hydraulic cylinder.
Figure 19:
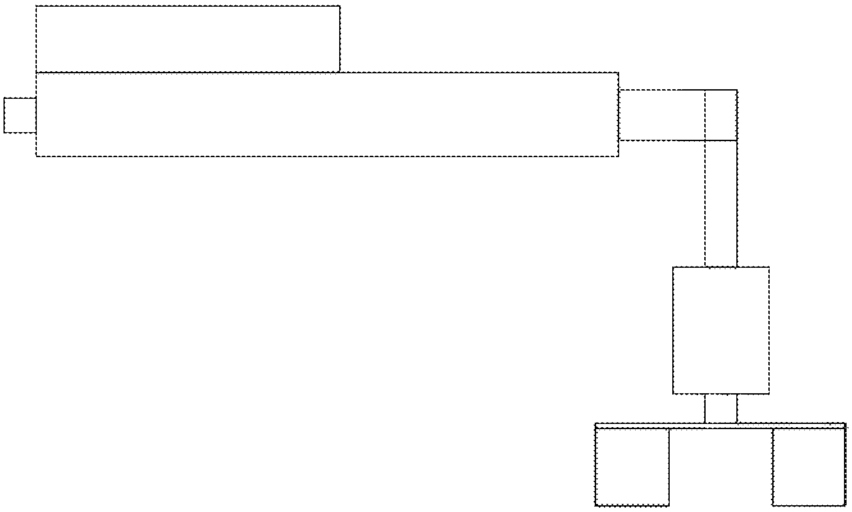
FIG. 19 is a diagram of driving the vertical lifting mechanism by an electric push rod.

In order to realize the lifting automation of the vertical lifting mechanism 3 easily, taking FIG. 4 and FIG. 14 as an example, a bottom portion of a sliding block 23 is connected with a lifting air cylinder 31 by connecting members 30, the lifting air cylinder 31 may be connected with the detection device and the aligning mechanism, and the lifting air cylinder 31 lifts to drive the detection device and the aligning mechanism connected therewith to lift up and down. In other embodiments, the way in which the vertical lifting mechanism 3 is driven to lift includes, but is not limited to being driven by an air cylinder as shown in FIG. 17, being driven by the hydraulic cylinder as shown in FIG. 18, being driven by a screw as shown in FIG. 15, being driven by a synchronous belt as shown in FIG. 16 and being driven by a push rod or an electric push rod as shown in FIG. 19.

Similarly, the horizontal traveling mechanism 2 may be in the form of guiding rail, including a transverse guiding rail 21 and a longitudinal guiding rail 22, wherein the transverse guiding rail 21 is arranged perpendicular to the rail 6, and the longitudinal guiding rail 22 is arranged parallel to the rail 6; the longitudinal guiding rail 22 is disposed slidably on the transverse guiding rail 21, the transverse guiding rail 21 drives the longitudinal guiding rail 22 to move, and the longitudinal guiding rail 22 is provided with a sliding block 23 that may slide along the longitudinal guiding rail 22; the vertical lifting mechanism is connected with the sliding block 23 and moves transversely or longitudinally with the sliding block 23. Or, the horizontal moving mechanism 2 may be a structure of synchronous belts or other suitable structures.

Similar to the vertical lifting mechanism 3, the longitudinal guiding rail 22 of the horizontal moving mechanism 2 is driven by an air cylinder, a hydraulic cylinder, a screw, a synchronous belt or a push rod, or other suitable forms. For the implementation of driving by the air cylinder, the hydraulic cylinder, the screw, the synchronous belt or the push rod may adopt the existing technology, which may be manual or electric, etc., and will not be expanded here.

Figure 3:
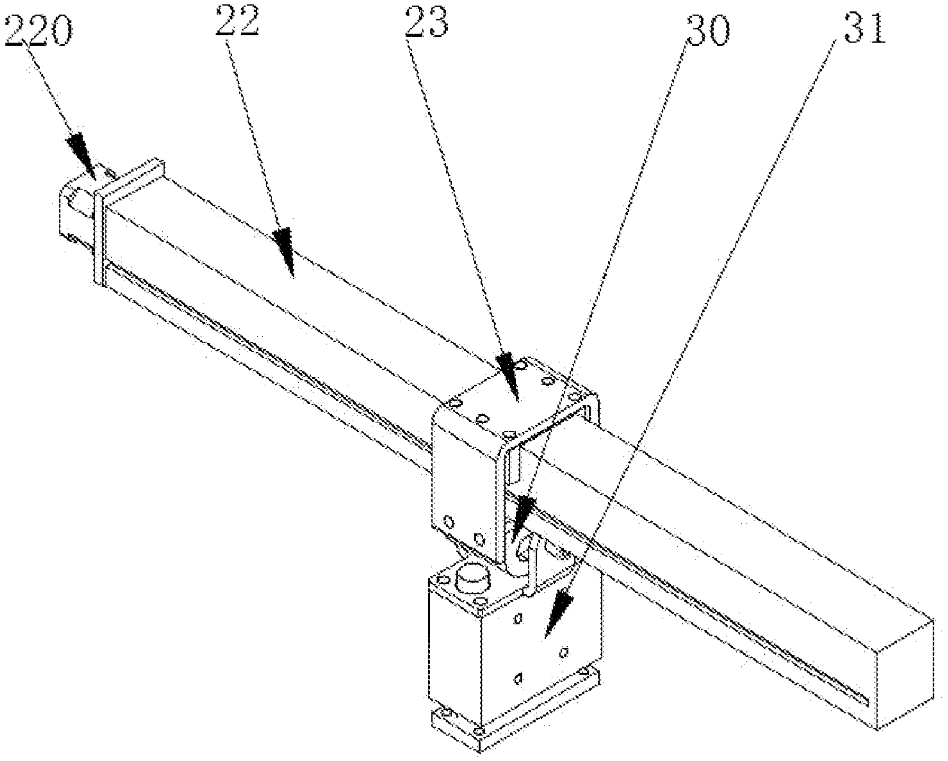
FIG. 3 is a structural diagram of a longitudinal guiding rail according to the invention.

For ease of automation, taking FIG. 3 as an example, an end portion of the longitudinal guiding rail 22 is provided with a guiding rail motor 220, which drives the longitudinal guiding rail 22 to move transversely on the transverse guiding rail 21 through the air cylinder, the hydraulic cylinder, the screw, the synchronous belt or the push rod. The sliding block 23 is driven by the air cylinder, the hydraulic cylinder, the screw, the synchronous belt, or the push rod. For the implementation of driving by the air cylinder, the hydraulic cylinder, the screw, the synchronous belt or the push rod may adopt the existing technology, which may be manual or electric, etc., and will not be expanded here.

The detection device is hinged to the vertical lifting mechanism, and when the detection device touches the rail plane, fine adjustments may be made to ensure that the detection device closely fits the rail plane.

The rail section where the rail detection system of the present application stops is generally shorter and may be regarded as a straight rail. Correspondingly, the transverse guiding rail 21 and the longitudinal guiding rail 22 of the horizontal moving mechanism may also be configured into a straight guiding rail.

For the transverse or longitudinal movement of the horizontal moving mechanism of the present application, in other embodiments, other forms may also be used; for example, the longitudinal guiding rail may move both transversely and longitudinally.

The aligning mechanism is introduced below. As shown in FIG. 1, the aligning mechanism is a guiding-wheel-type aligning mechanism.

Figure 2:
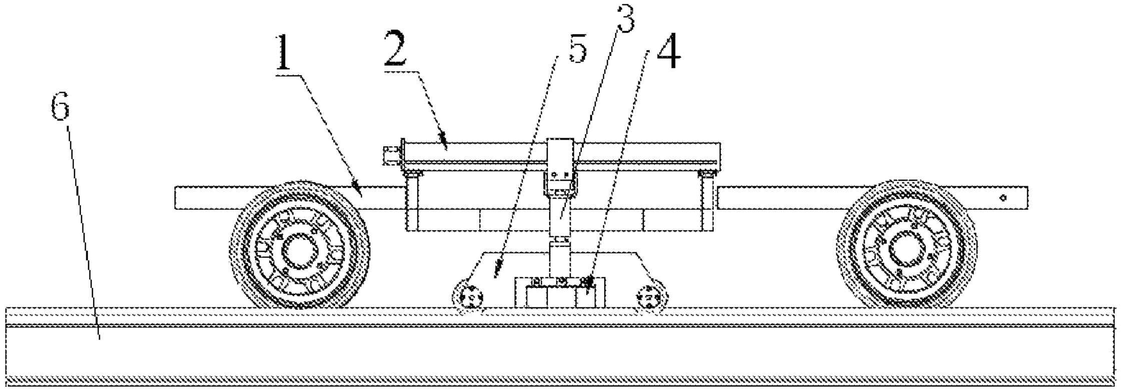
FIG. 2 is a side structural diagram of FIG. 1.

Specifically, with reference to FIGS. 1 and 2, the aligning mechanism 5 is a guiding-wheel-type aligning mechanism, which includes a guiding wheel 51 and a vertical plate 52. The vertical plate 52 is disposed on a lower end of the vertical lifting mechanism 3, and the guiding wheel 51 is connected with the vertical plate 52. The detection device 4 is connected with the vertical plate 52, and the guiding wheel 51 is used to be disposed movably with two inner surfaces fitting the inner and outer surfaces of the rail head. When the vertical lifting mechanism 3 drives the aligning mechanism 5 and the detection device 4 to descend, the two inner surfaces of the guiding wheel 51 and the rail interact with each other, so that the two inner surfaces of the guiding wheel 51 are adjusted to fit the tread surface of the rail head and the inner and outer surfaces of the rail head, thereby aligning the guiding wheel 51 with the center of the rail. When the vertical driving force is pressed down, the transverse driving force partially transformed by the guiding wheel 51 makes the detection device 4 connected to the vertical plate 52 aligned to the position to be detected. The vertical plate 52 is used to arranged and mount the detection device 4, and the detection device 4 is connected with the guiding wheel 51 so that the positions of the detection device 4 and the guiding wheel 51 are relatively fixed. When the two inner surfaces of the guiding wheel 51 are adjusted to fit the inner and outer surfaces of the rail head, the center of the guiding wheel is aligned with the center of the rail, and the detection device 4 may be aligned with the position of the rail to be detected without position deviation. It should be understood that during the descent process, the guiding wheel should be aligned with the rail first, so that the detection device is aligned.

Figure 5:
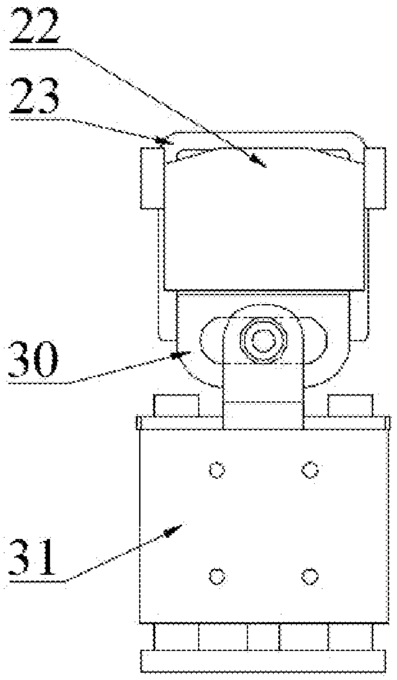
FIG. 5 is a structural diagram of guiding wheels according to the invention.
Figure 5:
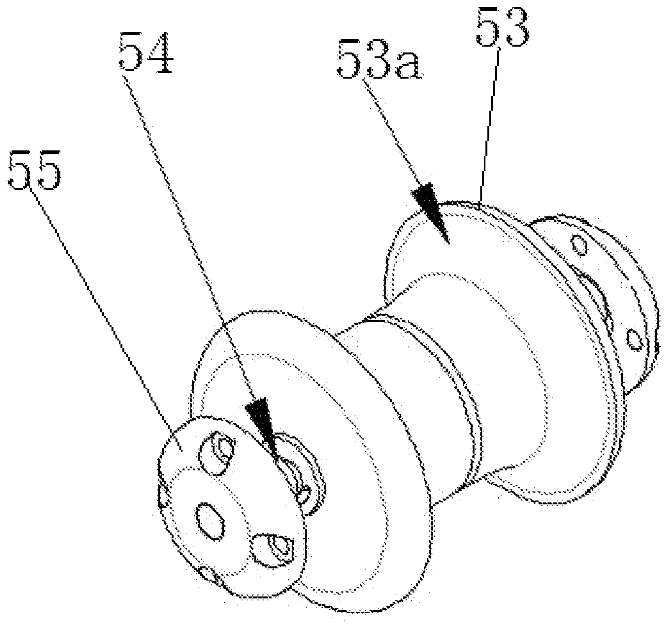
Figure 6:
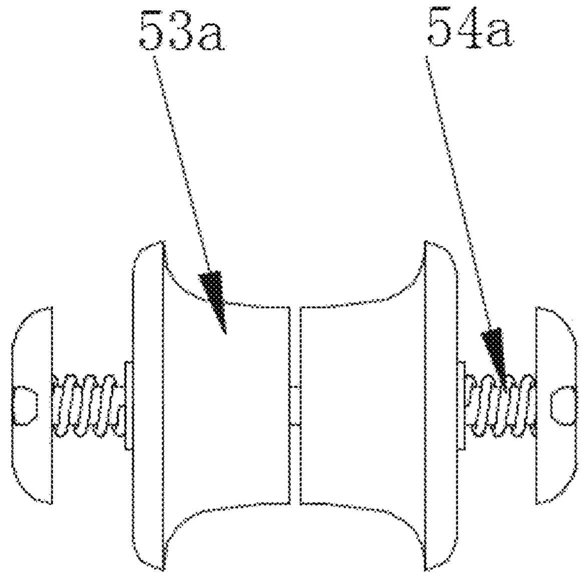
FIG. 6 is a front diagram of FIG. 5.

With reference to FIGS. 5 and 6, the guiding wheel 51 of the aligning mechanism 5 includes two side guiding wheels 53, a connecting shaft 54, and an elastic member 55, wherein the two side guiding wheels 53 are sleeved on the connecting shaft 54 to form the guiding wheel 51, and an outer surface or an inner surface of the two side guiding wheels 53 is provided with the elastic member 55 so that the guiding wheel is used for the movable arrangement of the two inner surfaces 53*a* fitting the rail head. Then, the vertical plate 52 is connected with the connecting shaft 54 so that the guiding wheel 51 is connected with the vertical plate 52. The elastic member 55 may be an elastic connecting member such as a spring, as shown in FIGS. 5 and 6, compression springs 55*a* are provided on the outer surfaces of the two side guiding wheels 53 so that the inner surfaces of the two side guiding wheels 53 used to fit the inner and outer surfaces of the rail head are movably arranged. The vertical lifting mechanism provides a vertical downward force. When the detection device 4 deviates from the center of the rail to the inside/outside, the inner surface 53*a* of the side guiding wheel 53 on the inside/outside is pressed by the inner/outer surface of the rail head, and the elastic member 55 on the inner/outer side is compressed and gives the device a force pushing to the center of the rail; since the connecting member 30 is a follow-up mechanism to allow the vertical lifting mechanism and the aligning mechanism and the detection device connected below to move transversely in a direction perpendicular to the extension direction of the rail, the vertical lifting mechanism, the aligning mechanism and the detection device are driven to move to the center of the rail until the inner surfaces 53*a* of the guiding wheels on both sides are attached to the inner and outer surfaces of the rail head while balancing the force of the elastic members 55 on both sides, so that the vertical lifting mechanism and the detection device are aligned with the center of the rail, and the downward force provided by the vertical lifting mechanism is perpendicular to the surface of the rail, thereby attaching and tightening the detection device positively to the surface of the rail. Or, similar to the connecting member 30, by configuring the guiding rail 21 as a follow-up guiding rail, the vertical lifting mechanism, the aligning mechanism, and the detection device connected below are allowed to move transversely perpendicular to the extension direction of the rail together, which may also realize the follow-up centering effect.

For the detection device 4 in the application, the detection device 4 includes one or more probes (not shown in the figure), wherein the type, quantity, structure (such as whether including a telescopic structure) and the control method of the probe may adopt the appropriate method in the prior art, which is not limited in the application. When the aligning mechanism completes alignment, the detection device is aligned with the detection position, then the probe may be arranged at the position to be detected, such as the tread surface of the rail head, the left and right sides of the rail head, the waist of the rail and the bottom of the rail.

The aligning process of the detection system for the rail shown in FIG. 1 will be described below.

When the traveling mechanism 1, such as the trolley 10, travels to the vicinity of the preliminarily-positioning position to be detected of the rail (such as weld seams) and stops, the position to be detected of the rail is further precisely positioned, then the straight guiding rail motor 220 drives the longitudinal guiding rail 22 to move on the transverse guiding rail 21 and the sliding block 23 to move on the longitudinal guiding rail 22, so that the sliding block 23 and the device part below may accurately move a specified distance to reach a specified position directly above the position to be detected of the rail. The position to be detected of the rail may be positioned by a positioning method, such as a camera, which is not limited here.

The vertical lifting mechanism descends, such as using the lifting cylinder 31 in a pneumatic manner, so that the aligning mechanism and the detection device fall rapidly and stably on the rail plane.

Figure 13:
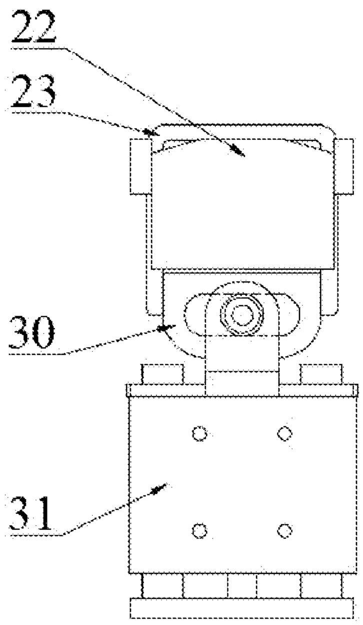
FIG. 13 is a diagram of a follow-up mechanism on a vertical lifting mechanism.

When the lifting cylinder 31 falls, and the guiding wheel 51 of the aligning mechanism starts to contact the rail head, the guiding wheel is subjected to the downward force of the vertical lifting mechanism, and the inner surfaces of the rims of the guiding wheels 53 on both sides are gradually compressed by the inner and outer surfaces of the rail head and move to both sides of the rail while the rims of the guiding wheels 53 on both sides may be ensured to fit the side of the rail head under the action of the compression spring 55*a*. During this process, with reference to FIG. 13, since the connecting member 30 is a follow-up mechanism, e.g., being provided with long holes, the lifting cylinder 31 and the aligning mechanism and detection device connected below are allowed to move transversely in the direction perpendicular to the extension direction of the rail, and the pressure provided by the compression spring 55*a* will drive the lifting cylinder 31, the aligning mechanism and the detection device to move along the direction perpendicular to the extension direction of the rail until the forces of compression spring 55*a* on both sides are balanced; finally, due to the joint action of the lifting cylinder and the compression spring, the two side guiding wheels 53 may completely fit the tread surface of the rail head and the inner and outer surfaces of the rail head, the lifting cylinder 31 is automatically aligned with the center of the rail together with the detection device 4, and the downward force provided by the lifting cylinder 31 is perpendicular to the surface of the rail, so that the detection device may be positively pressed and tightly attached to the surface of the rail to facilitate subsequent detection.

As shown in FIG. 1, the horizontal moving mechanism is disposed on the traveling mechanism to be connected with the traveling mechanism, wherein the connection method is not limited. The difference from the previous embodiments is that the aligning mechanism is a proximity-switch-type aligning mechanism.

Figure 7:
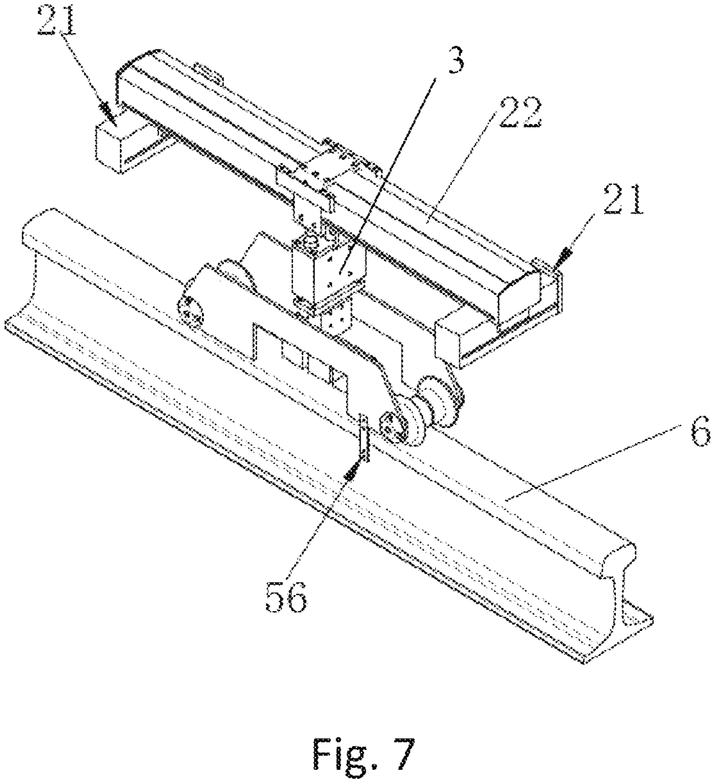
FIG. 7 is a structural diagram of another rail detection system according to the invention, without a traveling mechanism.
Figure 8:
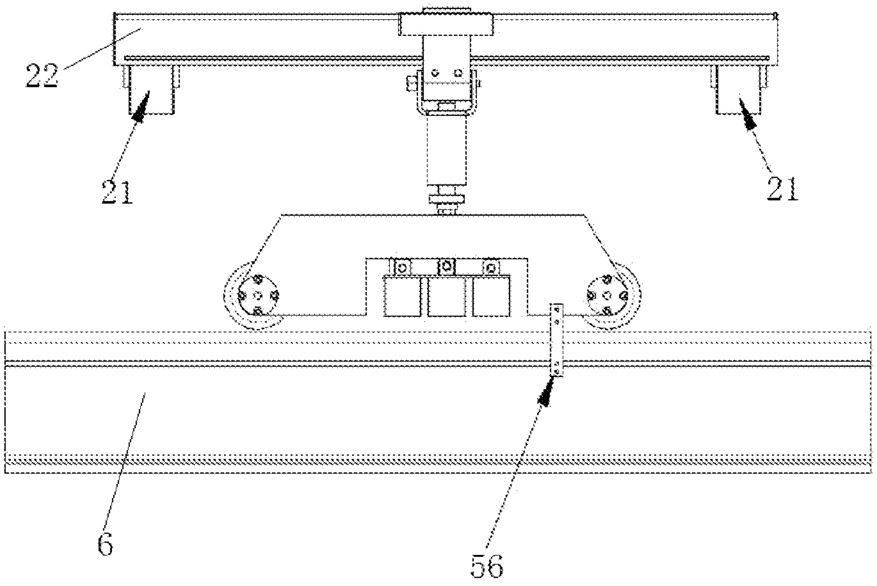
FIG. 8 is a side diagram of FIG. 7.

As shown in FIGS. 7 and 8, when the aligning mechanism is a proximity-switch-type aligning mechanism, the aligning mechanism includes a proximity switch 56; the proximity switch 56 is arranged at a lower end of the vertical lifting mechanism 3 and is located on the inside or outside surface of the rail head of the rail 6, then a relative position between the device as a whole and the tread surface of the rail head is determined by the walking wheels (such as traveling wheels 12) of the traveling mechanism, wherein within a sensing control range, the proximity switch 56 senses and adjusts to realize alignment with the center of the rail. For example, the proximity switch 56 senses the distance from it to the side of the rail head 16 mm below the tread surface of the rail head of the rail 6 and adjusts the movement of the horizontal moving mechanism according to a preset distance, driving the detection device below the horizontal moving mechanism to move to the position to be detected and be aligned with the center of the rail. The vertical lifting mechanism drives the detection device down to the position to be detected, and of course other suitable sensing distances are also possible. Specifically, the proximity switch senses the distance from it to the side of the rail head and adjusts and controls the longitudinal guiding rail 22 to slide on the transverse guiding rail 21 according to the preset distance, so that the detection device is aligned with the rail; then, the detection device below the longitudinal guiding rail 22 is moved to the position to be detected and aligned directly above the center of the rail, and the vertical lifting mechanism drives the detection device to drop to the position to be detected. In the application, the device as a whole may refer to the detection device and the devices arranged on it to form a general term for the device.

Further, the horizontal moving mechanism and the vertical lifting mechanism refer to the previous embodiments, and will not be expanded here.

This solution relies on the proximity switch to sense and adjust the distance to the rail. The distance adjustment is to control the longitudinal guiding rail to move along the direction perpendicular to the extension direction of the rail by the proximity switch through electrical connection or other connection methods. The specific implementation form of distance adjustment may be the controlled connection between the transverse guiding rail 21 and the proximity switch 56 perpendicular to the rail direction, wherein the transverse guiding rail 21 is mounted on the two ends of the longitudinal guiding rail 22 and is fixed on the vehicle body, responsible for driving the whole device to move left and right along the direction perpendicular to the position aligning with the center of the rail; the proximity switch 56 is located on the inner side or the outer surface of the rail head below the whole device.

In order to facilitate the alignment of the detection device with a vertical centerline of the rail, i.e., the above-mentioned alignment, after the previous use, the device as a whole formed by the detection device and the device on it is moved to a certain distance toward the direction of the proximity switch 56 relative to the rail by the transverse guiding rail 21.

Figure 9:
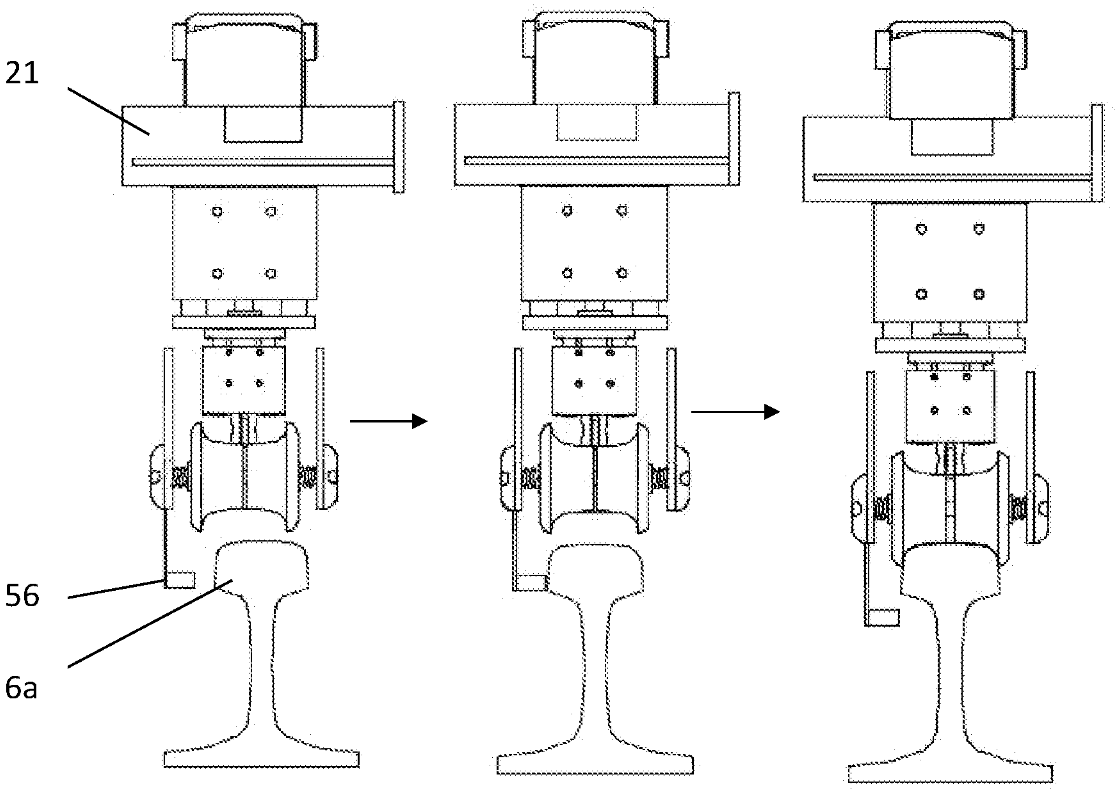
FIG. 9 is a diagram showing the process of alignment of the rail detection system shown in FIG. 7 according to the invention.

As shown in FIG. 9, when the vehicle travels to the position of the position to be detected and the device as a whole is moved to the position directly above the position to be detected by the transverse guiding rail 21, the device as a whole is in a lifted state and is biased towards the direction of the proximity switch 56 relative to the rail.

The transverse guiding rail 21 is initiated to drive the device as a whole to move toward the center of the rail until the proximity switch 56 below the device as a whole is close to the 16 mm below the inner side of the rail head 6*a*, the proximity switch 56 sends a signal that the transverse guiding rail 21 stops working, and then the device as a whole is aligned with the center of the rail, and the detection device is aligned with the center of the rail.

Afterwards, the vertical lifting mechanism works, driving the device as a whole to fall, and the guiding wheel is pressed downward to completely fit the tread surface of the rail head, so that the alignment of the device is completed.

When the vertical lifting mechanism lifts up and down, if the drive device fails to accurately control the lowered displacement, the detection device may be lowered to a large displacement and collide with the rail. In order to prevent this from happening, a force-bearing mechanism is added. Specifically, the aligning mechanism further includes the force-bearing mechanism, wherein when the vertical lifting mechanism drives the detection device to move longitudinally, the force-receiving mechanism contacts the rail head to consume part of the vertical driving force of the vertical lifting mechanism to prevent the detection device from displacing too much.

The force-bearing mechanism is the split-type guiding wheel in the previous embodiment or other guiding wheels in the prior art. In addition to the guiding wheel, the force-bearing mechanism may also be a pressing block or the like.

In other improved embodiments, the horizontal moving mechanism is arranged in front or behind the traveling mechanism, and is fixedly connected with the traveling mechanism. For example, the fixed connection may be a threaded connection structure, flange, welding, etc. as long as it can be realized that the relative position of the horizontal moving mechanism and the traveling mechanism remains unchanged, and the horizontal moving mechanism does not generate displacement or offset relative to the traveling mechanism when the horizontal moving mechanism travels with the traveling mechanism.

Or, in other improved embodiments, the horizontal moving mechanism is arranged in front or behind the traveling mechanism, and is hingedly connected with the traveling mechanism. Then, when the horizontal moving mechanism travels with the traveling mechanism, the relative position of the horizontal moving mechanism and the traveling mechanism may change, and the horizontal moving mechanism may generate displacement or offset relative to the traveling mechanism. Further, the force-bearing mechanism may be added, so as to prevent the detection device from colliding with the rail when the horizontal moving mechanism is displaced or deviated. The force-bearing mechanism may be a guiding wheel or a pressing block, etc., as in the previous embodiment, and the guiding wheel may be an existing one-piece guiding wheel, or a split-type guiding wheel in front, which is no longer expanded here.

Figure 12:
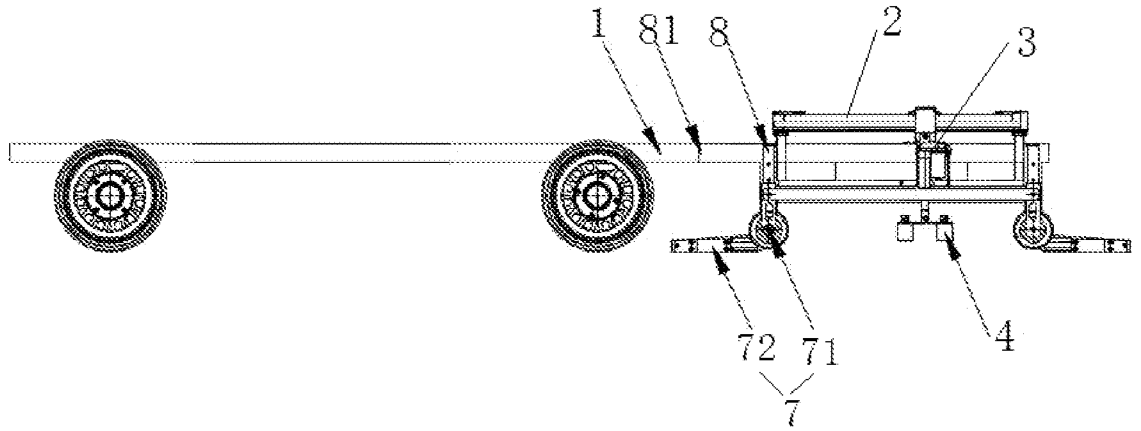
FIG. 12 is a side structural diagram of FIG. 11.

With reference to FIGS. 11 and 12, the aligning mechanism may also be a guiding mechanism 7, the guiding mechanism 7 is connected with the horizontal moving mechanism 2, and the guiding mechanism provides a guiding function for the horizontal moving mechanism, so that the detection device is aligned with the position to be detected.

In the embodiment, the transverse movement/longitudinal movement of the detection device 4 on the horizontal plane is realized by the horizontal moving mechanism 2, the vertical lifting mechanism 3 lifts the detection device up and down, and the position of the detection device 4 may be adjusted by the guiding function of the guiding mechanism, so that the detection device 4 is aligned with the position to be detected on the rail.

The horizontal moving mechanism 2 is arranged on the traveling mechanism 1 through the bracket 8, or the horizontal moving mechanism 2 is arranged behind the traveling mechanism through the bracket 8. The bracket 8 is fixedly connected or hingedly connected to the traveling mechanism, and the fixed connection may be glued, welded, riveted and bolted connections. The traveling mechanism has been introduced in FIG. 1 above, which can be used for reference here. As shown in FIG. 11, when the traveling mechanism is the trolley 10, the horizontal moving mechanism 2 may be disposed behind the frame 11 and may be connected with the frame 11 by the bracket 8, and the bracket 8 is connected with the frame 11 by the connecting member 81, wherein in order to correspond to the two left and right rails, the horizontal moving mechanism 2 is symmetrically disposed on both sides of the detection trolley 10. In another embodiment, when the traveling mechanism is the trolley 10, the horizontal moving mechanism 2 may be disposed on the frame 11 by the bracket 8 and connected with the frame 11, and the bracket 8 is fixedly or hingedly connected with the frame 11, wherein in order to correspond to the two left and right rails, the horizontal moving mechanism 2 is symmetrically disposed between the front and rear traveling wheels on both sides of the detection trolley 10.

Further, the horizontal moving mechanism 2 is connected with the traveling mechanism 1 by the bracket 8, the bracket 8 is connected with the traveling mechanism 1, the bracket 8 is connected with the horizontal moving mechanism 2 by the elastic tension device 9, and the elastic tension device 9 adjusts a relative position between the horizontal moving mechanism 2 and the rail.

As shown in FIG. 11, the elastic tension device 9 may be a spring tension device, and in other embodiments, a suitable device such as a nitrogen push rod may be used.

Further, the guiding mechanism includes a guiding member; when the position of the horizontal moving mechanism does not deviate left and right, the guiding member does not contact the rail; when the horizontal moving mechanism deviates relative to the rail, the elastic tension device makes the guiding member fit the rail through elastic force, and adjusts the position of the detection device so that the detection device is aligned with the position to be detected.

Specifically, the guiding member includes a guiding wheel 71 or a guiding plow 72, a rim of the guiding wheel 71 is attached to the surface of the rail head, and a pad of the guiding plow 72 is close to the inner surface of the rail head. The guiding wheel 71 and the guiding plow 72 may also be arranged simultaneously.

The guiding plow 72 may contact the inner side of the rail in a fixed-contact manner such as by pads, or in a rolling-contact manner such as by rollers, or by soft materials such as nylon or hard materials such as metal; the guiding plow 72 may further contact the inner side of the rail by other suitable structures or materials.

The detection device 4 is hingedly connected with the vertical lifting mechanism 3. When the detection device 4 contacts the rail plane of the rail, fine-adjustment may be automatically performed to ensure that the detection device is closely attached to the rail plane, and a fixed connection may also be used.

The aligning process of the detection system for the rail shown in FIG. 11 will be described below.

As shown in FIG. 11, the device includes the trolley 10, the bracket 8, the elastic tension device 9, the guiding mechanism 7 and the detection device 4, wherein the elastic tension device 9, the guiding mechanism 7 and the detection device 4 are arranged in two respectively, and arranged symmetrically on both sides behind the trolley 10 in a dragging manner.

The trolley 10 is connected to the bracket 8 through a detachable connecting member 81, so as to facilitate the connection and detachment of the operator.

The pressure on the vertical direction of the body of the trolley 10 and the gravity of the bracket 8 make the guiding wheel 71 of the guiding mechanism 7 fit closely with the tread surface of the rail head, ensuring that the detection device 4 is in close contact with the tread surface of the rail head and that the detection will not be affected by jumping when passing the turnout at high speed. There are guiding wheels 71 on both sides of the bracket 8 in contact with the rail for load bearing, and each of the guiding wheels 71 is equipped with the elastic tension device 9, so as to ensure that the detection device 4 is perpendicular to the surface of the rail, and may offset the impact and not affect the detection when the body snakes from side to side.

The guiding effect of the guiding plow 72 is similar to the guiding wheel 71, the guiding plows 72 of the guiding mechanism 7 on both sides provide guidance for the device as a whole by contacting the inner side of the rail, and the device as a whole may refer to the detection device and the devices arranged thereon to form a general term for a device.

Driven manually, driven with the hydraulic cylinder or the motor drive, or driven pneumatically etc., the longitudinal guiding rail 22 enables the sliding block 23 and the detection device 4 thereon to accurately move the specified distance to reach the specified position using screw, synchronous or cylinder belt and other structures, thereby realizing the precise positioning of the detection device 4 along the direction of the guiding rail.

By using suitable structures such as manual, hydraulic cylinder, screw, synchronous belt, electric push rod or cylinder, the vertical lifting mechanism 3 makes the detection device fall rapidly and stably on the rail plane by manual, hydraulic drive, motor drive or pneumatic and other suitable methods after finding the specified position.

The preferred embodiments of the present invention disclosed above are only used to help the description of the present invention. The preferred embodiments do not describe all the details, and are not intended to limit the invention only to be the specific embodiments. It is obvious that various modifications and changes can be made to the content of the specification. The present invention selects and specifically describe the embodiments with the purpose of better explain the principle and practical use of the present invention, such that a person skilled in the art can well understand and utilize the present invention. The present invention is merely limited by the appended claims and the scope and equivalents thereof.

What is claimed is:

1. A rail detection system, comprising:

a traveling mechanism, traveling along a rail to transport a detection device to a vicinity of a preliminary-positioned position to be detected for preparing detection operations;

a horizontal moving mechanism, connected with the traveling mechanism, wherein the traveling mechanism drives the horizontal moving mechanism to travel, and after the traveling mechanism stops at the vicinity of the position to be detected, the horizontal moving mechanism moves parallel to an extension direction of the rail to accurately move the detection device to a position directly above a precisely-positioned position to be detected;

a vertical lifting mechanism, connected with the horizontal moving mechanism, wherein the vertical lifting mechanism is provided with the detection device, and the vertical lifting mechanism lifts vertically to drive the detection device to lift up and down;

an aligning mechanism, connected with the detection device and comprising a force-bearing mechanism and a follow-up mechanism, wherein the force-bearing mechanism is configured to generate a force along a direction perpendicular to the extension direction of the rail when being in a non-aligned position, and under the condition of being forced, the follow-up mechanism disposed between the vertical lifting mechanism and the horizontal moving mechanism makes an adaptive adjustment movement along the direction perpendicular to the extension direction of the rail so that the detection device is aligned with a center of the rail.

2. The rail detection system according to claim 1, wherein the force-bearing mechanism is a guiding wheel, the guiding wheel is disposed at a lower end of the vertical lifting mechanism, and the guiding wheel is connected with the detection device and comprises two side guiding wheels elastically connected with each other; an inner surface of the side guiding wheel is used to fit inner and outer surfaces of a rail head so that the aligning mechanism may achieve alignment; when the vertical lifting mechanism drives the aligning mechanism to move down, two inner surfaces of the guiding wheel are adjusted movably by an elastic force to fit a tread surface of the rail head and surfaces of the inner and outer sides of the rail head so that the detection device is aligned with the position to be detected.

3. The rail detection system according to claim 2, wherein the force-bearing mechanism comprises two symmetrical side guiding wheels, a connecting shaft and an elastic member; the two side guiding wheels are sleeved on the connecting shaft to form the guiding wheel, and the outer surfaces or the inner surfaces of two side guiding wheels are provided with the elastic member so that the guiding wheel is used for movable configuration of the two inner surfaces that fit the inner and outer surfaces of the rail head.

4. The rail detection system according to claim 3, wherein the force-bearing mechanism comprises a vertical plate; the vertical plate is disposed at the lower end of the vertical lifting mechanism, the guiding wheel is connected with the vertical plate, and the detection device is connected with the vertical plate so that the guiding wheel is connected with the detection device.

5. The rail detection system according to claim 2, wherein the follow-up mechanism is disposed at a joint between the vertical lifting mechanism and the traveling mechanism, and the follow-up mechanism adopts a structure of shafts and bearings that are movably fitted along a long waist hole provided along the direction perpendicular to the extension direction of the rail or the follow-up mechanism adopts a structure of a freely-movable guiding rail provided along the direction perpendicular to the extension direction of the rail.

6. The rail detection system according to claim 1, wherein the aligning mechanism comprises a proximity switch, and the proximity switch is disposed at the lower end of the vertical lifting mechanism and located at the inner or outer surface of the rail head; the proximity switch senses a distance between the proximity and the inner or outer surface of the rail head at a certain distance below the tread surface of the rail head within a sensing range, and adjusts the horizontal moving mechanism to move according to a preset distance to drive the detection device below the horizontal moving mechanism to move to the position to be detected for aligning directly above the center of the rail; the vertical lifting mechanism drives the detection device to move down to the position to be detected.

7. The rail detection system according to claim 1, wherein the force-bearing mechanism comprises a guiding wheel and a guiding plow, the guiding wheel fits a tread surface of the rail head and the inner surface of a rail head, and the guiding plow fits close to the inner surface of the rail head.

8. The rail detection system according to claim 7, wherein the follow-up mechanism comprises an elastic tension device, and the detection device is connected with the traveling mechanism by a bracket; the bracket is connected with the horizontal moving mechanism by the elastic tension device, and the elastic tension device provides an elastic force along the direction perpendicular to the extension direction of the rail to adjust a relative position between the detection device and the rail.

9. The rail detection system according to claim 1, further comprising a transverse guiding rail that moves the horizontal moving mechanism along the direction perpendicular to the extension direction of the rail.

10. The rail detection system according to claim 9, wherein the horizontal moving mechanism moves along a direction parallel to the extension direction of the rail or moves along the direction perpendicular to the extension direction of the rail by way of being driven by an air cylinder, a hydraulic cylinder, a screw, a synchronous belt or a push rod; the vertical lifting mechanism is lifted by way of being driven by the air cylinder, the hydraulic cylinder, the screw, the synchronous belt or the push rod.

11. The rail detection system according to claim 9, wherein the horizontal moving mechanism is mounted and fixed on the traveling mechanism, or the horizontal moving mechanism is connected with the traveling mechanism by a drag connecting mechanism.

12. The rail detection system according to claim 9, wherein the horizontal moving mechanism is fixedly or hingedly connected with the vertical lifting mechanism.

13. The rail detection system according to claim 1, wherein the detection device is fixedly or hingedly connected with the vertical lifting mechanism.

14. The rail detection system according to claim 1, wherein the traveling mechanism realizes traveling by providing a drive device internally or connecting the drive device externally.

* * * * *